United States Patent [19]

Vincent, Jr. et al.

[11] 3,739,181

[45] June 12, 1973

[54] MAGNETICALLY POSITIONED CODING DEVICE

[75] Inventors: Charles S. Vincent, Jr., Stuarts Draft; John R. Van Patten, Waynesboro, both of Va.

[73] Assignee: General Electric Company, Salem, Va.

[22] Filed: Apr. 23, 1971

[21] Appl. No.: 136,854

[52] U.S. Cl. ........ 250/219 D, 40/142 A, 250/223 R

[51] Int. Cl. .......... G01n 21/30

[58] Field of Search .......... 40/106.45, 142 A; 250/223, 219 D; 104/88; 209/111.7, 111.8; 248/206; 235/61.11 E

[56] References Cited

UNITED STATES PATENTS

| | | | |
|---|---|---|---|
| 3,227,886 | 1/1966 | Dunigan | 250/223 |
| 3,228,133 | 1/1966 | Baerman | 40/142 A |
| 3,253,126 | 5/1966 | Baughman | 250/223 |
| 3,560,073 | 2/1971 | Knapp | 250/219 D |

*Primary Examiner*—James W. Lawrence
*Assistant Examiner*—D. C. Nelms
*Attorney*—Michael Masnik, Frank L. Neuhauser, Oscar B. Waddell and Joseph B. Forman

[57] ABSTRACT

An arrangement for coding objects moving on a conveyor line comprising a code carrying device for mounting on the object wherein said device comprises tabs for spatially defining a coded message, said tabs and carrier being magnetized in a special manner to cause the tabs to assume desired, predetermined locations on the carrier in response to magnetic circuit coaction between carrier and tabs.

3 Claims, 5 Drawing Figures

*INVENTOR.*
CHARLES S. VINCENT JR.
JOHN R. Van PATTEN
BY Michael Masnik
THEIR ATTORNEY

MAGNETICALLY POSITIONED CODING DEVICE

This invention relates to an object identifying device, and more particularly to coding apparatus for identifying the nature of objects moving along a path as, for example, on a conveyor, or their destination.

In automatic distribution systems for objects, for example, movable along a conveyor, it is common practice in order to accomplish automatic movement and location to identify the nature of the package by use of a code on the side of the package. This code may be picked up by a sensing apparatus as it goes by a sensing station. The sensing device interprets the code and operates the elements of the conveyor system in a manner which will cause the object to be diverted to a particular location.

One of the methods used for coding packages is to employ movable elements bearing retroreflective material and place on the object in a certain predetermined pattern. The code is read by an optical system by which light is projected toward the object but is not returned unless the retroreflective material is in alignment with the optical system. When the light is returned to the sensing device, the fact is indicated by a photodetector resulting in control signals being generated. These control signals then operate other equipment such as, for example, for diverting the object identified from the conveyor line to a desired location.

Previous systems heretofore have used code identifying apparatus which has exhibited certain shortcomings. For example, setting up of the code elements on the package can be a time consuming operation and can result in inaccurate placement of the elements so that the pulses which are transmitted to the control apparatus sometimes give a false reading and the package is directed to the wrong destination. In addition, the elements may be jostled or moved accidentally out of position into a location which is intermediate to the pre-established code positions, thereby resulting in a code which is not compatible with the system. When such an element is mis-located between established positions, it oftentimes goes undetected resulting in the object being circulated continuously along the conveyor line. These and other difficulties experienced with prior art devices are overcome by the present invention. It is, therefore, an object of this invention to provide an improved object coding device.

It is another object of the invention to provide an improved coding device for attachment to an object intended for movement along a predetermined path.

A further object of the present invention is the provision of a relatively foolproof device for preventing improper coding which is possible in other systems.

In accordance with one aspect of the invention, there is provided an object classifier comprising a carrier and a plurality of tabs or movable elements which are slideable on the carrier surface to predetermined positions associated with an identifiable code. Each of the tabs has its front faces magnetized to be of the same one polarity and all of its back faces to be of the same opposite polarity. The carrier, on the other hand, is magnetized at predetermined positions along a given axis on its surface. The front and back faces of the carrier are magnetized to be of opposite polarity at said predetermined positions, and the polarity of said predetermined positions being alternately changed in series along this axis. This results in the tab being magnetically attracted to remain in alternate ones of said series of positions and to be magnetically repulsed from the other alternate positions.

The aforementioned general objects and the various unique features of the present invention will be more clearly appreciated from the following description of a particular illustrative embodiment which is made in conjunction with the accompanying drawings wherein:

FIGS. 4(*a*) and 4(*b*) illustrate magnetic field patterns useful in explaining the operation of the invention.

Figure 1:
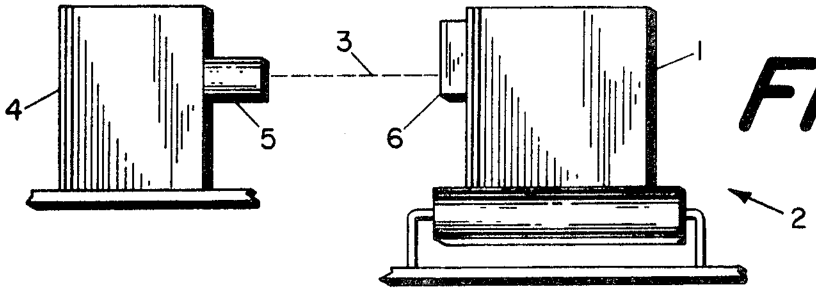
FIG. 1 illustrates in schematic form an object identifying system.

Referring to FIG. 1, there is shown an object identifying system consisting of an object or package 1 adapted for movement along a conveyor line shown symbolically by 2 in the directions which are essentially orthogonal to the sensing direction 3 of a sensor 4. The sensor 4 has a barrel 5 associated with its optical system aligned to scan coding elements to be described. The coding elements are located on the carrier 6 attached to the object. As the object moves on the conveyor past the sensing element 5, the code established by the placement of the coding elements carried on the carrier is identified. This results in signals being generated which can be employed to perform a desired function such as to count or to divert or to position the object somewhere along the conveyor line. In a given embodiment, the sensing device consists of a light source which directs a beam of light through a lens system toward retroreflective elements attached to tabs or coding elements located on the carrier. The reflected light from the retroreflective material strikes the sensor which then generates a signal indicating that a coding tab has been detected. Depending on the physical location of these tabs along an axis or axes associated with a particular code system — different signals are generated to identify the different objects and hence effect different control actions.

It can be understood that by use of such coding elements there is a likelihood that either because of jostling by the conveyor system or by manual interference, the coding elements could be mislocated thereby resulting in erroneous operation, such as an improper code being detected or an invalid code being overlooked resulting in the object continuing to circle on the conveyor line or the object being diverted to the wrong area. These problems are intended to be overcome by the present invention for which reference may first be directed to FIG. 2.

Figures 2, 3, 4A, 4B:
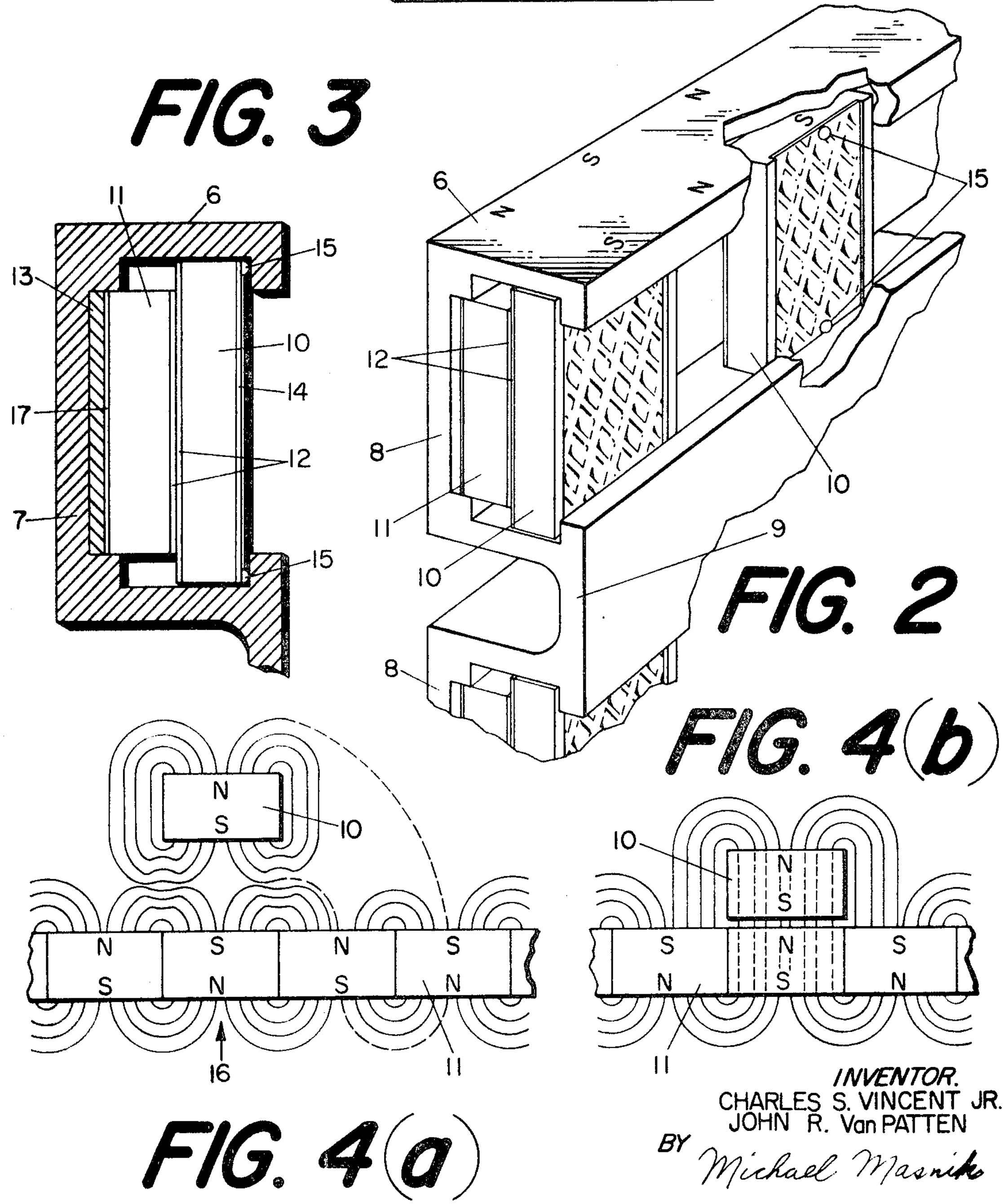
FIG. 2 is a ¾ view illustrating a preferred embodiment of the invention comprising a carrier and movable elements or tabs.
FIG. 3 illustrates in cross-sectional form the various components, their material content and their relationship to one another which is useful in explaining the arrangement of FIG. 1.

In FIG. 2, the carrier identified as 6 comprises an extruded aluminum piece having two C channels, an upper and a lower one, with a bridging section. The bridging section 9 is provided with an area in which readable alphanumeric markings may be entered for identifying code tab positions or for serving other informative functions. Each of the channels 7 and 8 carries a desired number of code tabs 10. For control purposes, it is desirable to distribute the code tabs in a given coded fashion along the length of each of the channels 7 and 8. Heretofore, mechanical means have been provided for moving the coded elements from one location to another and then locking these into place. This has proved to be cumbersome in many cases and vulnerable to improper coding. Accordingly, in the present invention we have provided an arrangement whereby the tabs may be attracted into predetermined acceptable locations while being repulsed from other unacceptable locations along the axis of each of the channels. In the present invention, each of the channels 7 and 8 is provided with a magnetic face 11 extending along the length of the channel. The details of this face will be described shortly. Both the tab 10 and the face 11 are made of magnetizable material. The magnetic tab is magnetized so that its front face, for example, facing away from the back of the channel, is magnetized to be of one polarity, such as a south pole whereas the face looking in the direction of the channel is magnetized to be of an opposite polarity, such as a north pole. The channel face 11 is magnetized at predetermined positions along its length in a similar manner to have its front face of the one polarity and its back face of the opposite polarity. The polarity, however, of the channel face 11 is alternated in discrete steps as one moves along the length of a channel such to be as shown in FIGS. 4(*a*) and 4(*b*). Thus, it is seen that if the tab 10 is placed as shown in the first code position, the tab and channel face polarities are north-south north-south proceeding in the direction from the tab to the channel, thus indicating that the magnetic lines of force enhance one another and, therefore, cause attraction to take place. This magnetic attraction acts effectively to lock the tab in this desired position. Any attempt to move this tab into the next adjacent position along the length of the channel will result in repulsion forces being generated to drive the tab to either side of this position. This is because the back of the tab and the magnetic face of the adjoining channel are of the same polarity thereby producing repulsion forces.

FIG. 4(*a*) illustrates the magnetic fields which are generated in the case of repulsion and FIG. 4(*b*) in the case of attraction. Thus, it is seen that any attempt to move the tab into an unacceptable zone results in forces driving the tab to either side identifying an acceptable zone position. Forces are thus generated in the present invention for preventing the tab from being located either in an unacceptable zone or in an area bridging an acceptable and unacceptable zone. This results in a more positive locking action which is an important feature of the present invention.

Referring to FIG. 3, there is shown the detail of the tab and channel magnetic circuit arrangements. One embodiment of carrier 6 has previously been described as being made of extruded aluminum. Since aluminum is not magnetic material, a magnetic face shown as 11 must be provided. In one embodiment it includes a face of magnetizable material made of what is sometimes referred to as plastic magnets. This is a material comprising a binder such as polyvinyl chloride loaded with magnetizable particles such as barium ferrite. This material is moldable into desirable shapes while retaining desirable magnetic properties. This plastic magnet is magnetized to alternate polarities along its length as previously indicated and fixedly attached to the carrier 6. In order to concentrate the magnetic field at the front face, there is provided a backplate 13 made of soft iron or mild steel. This magnetizable backing then causes the magnetic flux lines not to be dispersed at the back side of the plastic material but to be concentrated at the front face where the desirable attraction and repulsion forces are to be generated. The sliding tab consists of magnetizable material which in a preferred embodiment was the plastic magnet material previously described. The tab was dimensioned to slide in the C-shaped channels 7 and 8. To facilitate sliding, both the front face of the channel facing material 11 and the back face of the sliding tab 10 may carry a surface 12 to facilitate sliding. In a preferred embodiment, this involves a thin layer of Teflon* (*Trademark of E. I. DuPont de Nemours & Company) tape which prevents binding and sticking and minimizes friction when the tabs are being moved. To the face of the sliding tab 10, there is applied a retroreflective material 14. Thus, depending on the relative polarity of the interfaces between the face 11 and the tab 10 either attraction or repulsion forces are generated as shown in FIG. 4(*a*) and 4(*b*). This causes the tab to lock into place where the forces are predominantly of attraction and to be moved out of undesirable zones where the forces are predominantly of repulsion.

FIG. 2 illustrates a ¾ view of a further embodiment of the present invention designed to introduce a mechanical instability in the code tab design to further facilitate the rapid repulsion of the code tab from the excluded zones and attraction into the desired locations along the length of a channel such as 7. This instability is provided by protuberances 15 or raised portions on the tab which are located substantially on the vertical center line of the tab, at the top and bottom edges. These protuberances minimize friction between the tab edges and the adjoining lips of the channels along which the tab slides when it is being repelled from an excluded zone and attracted into a desired code location along the length of the channel. Also, these protuberances establish substantially point balances for the tab with respect to the channel surface which permit the tab to tilt about the protuberances as an axis and cause the tab to snap into a desired location in response to the attraction forces. Thus, as the tab moves toward the center line defining an excluded zone, i.e., where the repulsion forces are a maximum (see arrow 16 in FIG. 4(*a*)), the tab is forced outward and the protuberances cause the tab proper to pivot about the protuberances thereby modifying the magnetic circuit comprising the tab and channel. The modified magnetic circuit results in an imbalance which causes the tab to slideably snap into a position substantially aligned with the center line of the desired location. In this latter location, the tab once again assumes a stable or balanced position with respect to the channel face. Since there are no protuberances 15 on the back side of the tab, the tab lies flat against the channel surface which represents a stable condition.

In a similar manner, the channel 8 is provided with suitable materials to provide attraction and repulsion forces to be developed between its magnetic face and the tabs slideable in the channel. While two parallel channels have been shown, it is obvious that other channels may be added or subtracted and that the channels may follow other configurations other than the parallel line shown. It is sufficient that the channels define paths along which the tab or tabs may be moved. In addition, the tab has been shown to be of square or generally rectangular configuration. It is obvious that other shapes may be resorted to; for example, if the channel is presented in the form of a curvilinear surface, then the tab may be of circular form and slideable along this curved surface to predetermined areas establishing an acceptable code.

In defining the acceptable and nonacceptable zones to receive the tab for defining a code, it is necessary to establish some minimum spacing between possible tab locations. This minimum spacing then can be referred to as the excluded zone. In magnetizing the channel face, therefore, it is necessary to identify the location of these excluded zones and to magnetize essentially the center line of these zones to be of a repulsion polarity as compared with any adjoining tab face. The repulsion polarity preferably should have its maximum magnetic field strength located at the center line of the excluded zone. Actually, therefore, the maximum magnetic field strength would occur at the center line of the excluded and the acceptable tab zone locations. Or, in the alternative, the summation of the magnetic fields across the length of the excluded zone should result in the maximum field strength occurring at the center line of the excluded zone. In a similar manner, the summation of the field strengths in the acceptable zone should find its maximum field strength concentration at the center line.

While the invention has been particularly shown and described with reference to a preferred embodiment thereof, it will understood by those skilled in the art that changes in the form and details may be made therein without departing from the spirit and scope of the invention.

What is claimed as new and desired to be secured by Letters Patent of the United States is:

1. A code tab arrangement comprising a carrier having a plurality of spaced apart C-shaped channels, a plurality of tabs supported in said channels, each of the center portions of said C-shaped channels connecting its arms being magnetized at predetermined locations along its length, the front face of said portions being of one polarity and its back face of the other polarity, the polarity at each of said predetermined locations being alternated in series, said tabs being magnetized to have polarity patterns such that said tabs are magnetically attracted to remain in alternate ones of said series of locations but are magnetically repelled from the other alternate ones of said series of locations, said tabs being provided with a protuberance at each edge where it would contact the open arms of said channel, said tabs being caused to pivot about said protuberances in the vicinity of the undesired ones of said predetermined locations thereby modifying the magnetic circuit comprising said tabs and channel region and causing said tabs to snap into desired ones of said predetermined locations.

2. A coding device for identifying objects moving relative to a sensing station, said coding device comprising a carrier, said carrier comprising at least one channel, at least one tab slideable along said channel of said carrier, said tab comprising a magnetic material and being magnetized such that the front face is of one polarity and the back face is of the opposite polarity, said front face of said tab carrying a retroreflective surface for reflecting incident light toward said sensing station, said channel comprising a magnetic region extending the length of the channel, said magnetic region being magnetized at predetermined locations along the length of the channel, the front and back faces of said region being of opposite polarity at said predetermined locations and the polarity of said predetermined locations alternating in series along said length at predetermined spacings such that said tab is repelled from undesired ones of said predetermined locations and attracted to desired ones of said predetermined locations, said channel being dimensioned to permit the back face of said tab to slide along said magnetic region thereof in the vicinity of the attraction location and to permit the front face of said tab to slide along the edge of the two open arms of said channel in the vicinity of the repelling location, said tab being provided with a protuberance where its center line contacts the edge of the two open arms of said channel, said tab being caused to pivot about said protuberances in the vicinity of the undesired ones of said predetermined locations thereby modifying the magnetic circuit comprising said tab and channel region and causing said tab to snap into desired ones of said predetermined locations.

3. A coding device for identifying objects moving relative to a sensing station, said coding device comprising a carrier, said carrier comprising a plurality of parallel open faced channels, a plurality of tabs slideable along the channels of said carrier, each of said tabs comprising a magnetic material and being magnetized such that the front faces are of the same one polarity and all of the back faces are of the same opposite polarity, said front faces of said tabs each carrying a retroreflective surface for reflecting incident light toward said sensing station, each of said channels comprising a magnetic region extending the length of the channel, said magnetic region being magnetized at predetermined locations along the length of the channel, the front and back faces of said region being of opposite polarity at said predetermined locations and the polarity of said predetermined locations alternating in series along said length at predetermined spacings such that said tabs are repelled from undesired ones of said predetermined locations and attracted to desired ones of said predetermined locations, said tabs further including protuberances along the edges of their front faces for slideably contacting the channels along the edges of their open faces, said protuberances being located to cause said tab to pivot thereabout as the tab moves into an undesired location.

* * * * *